R. A. BELCHER.
SEED DRILL.
APPLICATION FILED SEPT. 23, 1919.
1,358,927.
Patented Nov. 16, 1920.
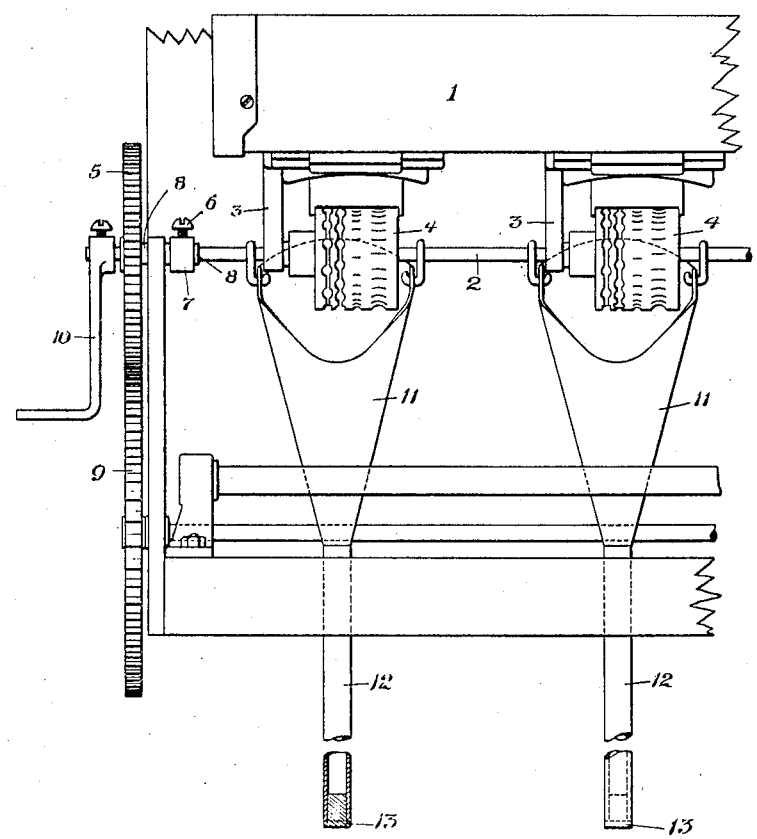
Inventor
R.A.Belcher,
By H. R. Kerslake
Attorney

UNITED STATES PATENT OFFICE.

RICHARD ANDREW BELCHER, OF STRATFORD, TARANAKI, NEW ZEALAND.

SEED-DRILL.

1,358,927.   Specification of Letters Patent.   Patented Nov. 16, 1920.

Application filed September 23, 1919. Serial No. 325,646.

*To all whom it may concern:*

Be it known that I, RICHARD ANDREW BELCHER, a citizen of the Dominion of New Zealand, and residing at Pembroke Road, Stratford, in the Provincial District of Taranaki, Dominion of New Zealand, a subject of the King of Great Britain and Ireland, have invented certain new and useful Improvements in Seed-Drills, of which the following is a specification.

This invention relates to implements used for sowing seeds and commonly known as seed drills.

After a seed drill has been used for sowing an area of land, a certain amount of seed is nearly always left in the seed box.

The seed so left is the cause of considerable waste and trouble, either owing to the slow and tedious work involved in its removal from the seed box, or where it is not removed by the waste of seed, and the subsequent resulting mixture when different seed is placed in the box preparatory to sowing a further area of land, such mixture resulting in almost endless trouble when the crops commence to grow.

The object of the present invention is to provide simple means, whereby the seed box can be rapidly emptied of a residue of seed at the finish of sowing operations, thus insuring a clean box at the commencement of subsequent sowing operations, besides effecting a saving of seed, and eliminating mixed crops.

According to the invention the shaft carrying the seed sowers of the drill, is driven through gearing from a road wheel of the implement in the usual way, and a small handle adapted to be slipped on one end of said shaft is provided.

A hopper with a tube leading to the ground is suspended from said shaft, below each seed sower and a stopper is inserted in the lower end of each tube.

The seed sower shaft is disconnected from its driving gear, whereupon it can be rapidly rotated by means of the handle on the end, to cause the seed sowers to empty the residue of seeds into the hopper and the tubes, which retain the seeds owing to their lower ends being closed.

The seeds can then be removed from the tubes and hoppers quickly and easily.

Referring to the drawing which shows in elevation portion of a seed drill with the improvement fitted thereto, 1 represents the seed box, 2 the seed sower shaft supported in bearings 3 suspended from the bottom of the box 1 and carrying the seed sowers 4.

The shaft 2 carries a toothed wheel 5 held thereon by a screw 6 passing through a collar 7 and the wheel sleeve 8, said wheel 5 being driven through gearing 9 from a road wheel in the usual way.

A small handle 10 is fitted on the end of the shaft 2, and a hopper 11 is suspended from said shaft below each seed sower 4.

A tube 12 leads from each hopper 11 to the ground, and a stopper 13 is inserted in the lower end of each tube.

By loosening the screw 6 the shaft 2 can be disconnected from the wheel 5, and is free to be rotated by the handle 10, the seed sowers 4 causing the residue of seeds in the box 1 to be emptied into the hoppers 11 and tubes 12.

The seeds which collect in the hoppers and tubes can be obtained on removing the stoppers 13.

What I do claim and desire to secure by Letters Patent of the United States is:—

1. In a seed drill, a seed box, a shaft below said box, a road-wheel driven gear loosely mounted on said shaft, manually operated means for locking the gear to said shaft, manually operated means for rotating said shaft when the gear is disconnected, seed sowers mounted on said shaft, hoppers arranged below said seed sowers and receiving seed from the same, and tubes having means for closing their lower ends, said tubes leading from the hoppers to the ground.

2. In a seed drill, a seed box, a shaft below said box, a road-wheel driven gear loosely mounted on said shaft, a sleeve and screw for locking the gear to said shaft, manually operated means normally stationary for rotating said shaft when the gear is disconnected, seed sowers mounted on said shaft, hoppers arranged below said seed sowers and receiving seed from the same, and tubes having means for closing their lower ends, said tubes leading from the hoppers to the ground.

In testimony whereof I have signed my name to this specification in the presence of two witnesses.

RICHARD ANDREW BELCHER.

Witnesses:
ERNEST WILFRED BOYCE CAREY,
PERCIVAL STAFFORD BYRNE.